E. N. Cummings,
Fly Trap,
N° 52,034. Patented Jan. 16, 1866.
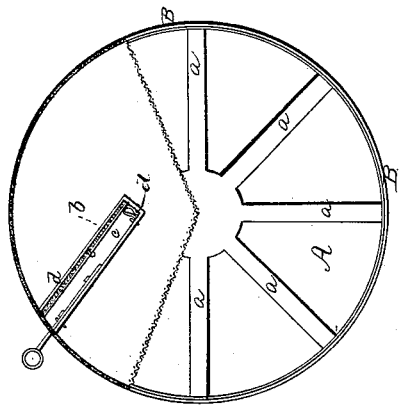
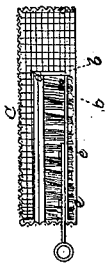
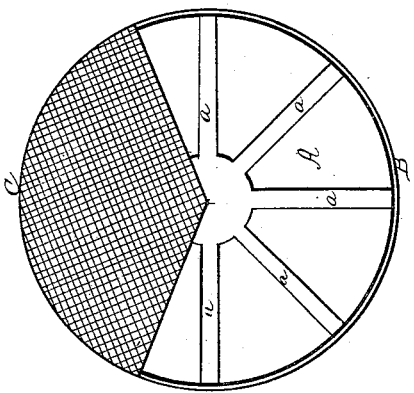
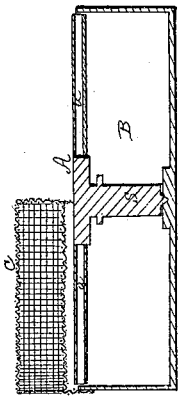
Witnesses:
Inventor.
E. N. Cummings
By his attorney

UNITED STATES PATENT OFFICE.

E. N. CUMMINGS, OF COLEBROOK, NEW HAMPSHIRE.

IMPROVEMENT IN FLY-TRAPS.

Specification forming part of Letters Patent No. 52,034, dated January 16, 1866.

*To all whom it may concern:*

Be it known that I, EDWARD N. CUMMINGS, of Colebrook, in the county of Coos and State of New Hampshire, have invented an Improved Fly-Trap; and I do hereby declare the same to be fully described in the following specification and represented in the accompanying drawings, of which—

Figure 1 is a top view of it; Fig. 2, a transverse section of it. Fig. 3 is a horizontal section taken through the entrapping-chamber. Fig. 4 is a transverse section of the said chamber, its entrance-passage, and the closing-door thereof.

My invention is an improvement on the trap which has a rotary cylinder, an entrapping-chamber, and a passage leading from the curved surface of the cylinder into such chamber, the cylinder being revolved by the reaction of a spring operating through a train of gears.

I do not make use of a cylinder; but in the place of it I employ a flat disk or circular plate provided with a series of radial ribs. I also apply to the entrance-opening of the entrapping-chamber a brush, whose purpose is to estop the insects or prevent them from being further moved along with and by the disk; and, furthermore, I employ, with the opening leading into the entrapping-box, not only a certain partition or partitions raised on the bottom of such box, but a gate or valve for closing such opening the partitions and valve, when the latter is raised into a vertical position, composing a passage to guide the flies or insects up into the entrapping-box, and also to prevent their escape therefrom, as well while the trap may be in operation as after the box may have been removed from the case of the trapping-disk. I would also remark that the brush is preferable to a rigid plate placed in its position, because, in consequence of the elasticity of its bristles, the brush is not so liable to injure or wound the flies or to cause them to be caught between it and the disk, so as to stop the rotation of the latter.

In the drawings, A denotes the rotary disk as provided with a series of radial ribs, *a a a*, arranged at equal distances apart, and projecting from the upper surface of such disk. This disk may be placed within a cylindrical box or case, B, and it should be mounted on a vertical shaft, *s*, and have an automatic mechanism for putting it in slow revolution. Such a mechanism as is employed to give motion to the minute-hand of a clock or watch will suffice for the purpose.

Over the disk A, and attached to the box B, is an entrapping-box, C, which, in form, in top view, is the sector of a circle, the top and sides of the box constituting a cover to the bottom, through which is an opening, *b*, arranged at an acute angle with a radial line passing through either extremity of it. The top and sides of the box I make foraminous, and I apply to the opening *b* a closing-valve, *c*, hinged to one side of such opening in such manner that the valve may be raised from a horizontal into a vertical position. To the opposite side of the opening, as well as to its inner end, I apply a partition, *d*, which, with the valve, when the valve is raised into a vertical position, constitutes a throat or passage raised over and above the opening *b*. Directly underneath the partition is a brush, *e*, which extends down from the bottom of the entrapping-box and to, or nearly to, the plane of the upper surfaces of the radial ribs of the disk A.

The arrangement of the opening *b* relatively to the radial ribs and their disk is of advantage, as by means of it each rib, while passing across the opening, moves from end to end of it, and thus forces the flies gradually along the brush and prevents them from being crushed between it and the rib.

In preparing the trap for use, the upper surface of the rotary disk should be covered with some preparation (as molasses and vinegar, for instance,) which will be attractive to flies or other insects which it may be desirable to entrap, after which the disk should be put in slow revolution, so as to carry the flies which may alight upon it directly underneath the entrapping-box and against the brush. The valve or door *c* being raised into a vertical position, the insects will fly or crawl through the opening *b* and into the entrapping-box. After a sufficient number of them may have been caught in the box the valve or door *c* may be closed down and the box be removed from the case B for the purpose of suffocating the insects by exposing them to the fumes of sulphuric ether or those of burning sulphur.

The entrapping-box should be applied to the box B by such means as will enable it to be readily removed therefrom.

I claim—

1. The arrangement and combination of the estopping-brush $e$ with the opening $b$, the entrapping-box C, the disk $c$ and its radial ribs, arranged as set forth.

2. The above-described arrangement or application of the partitions $d$ and gate or valve $c$, with the opening leading into the entrapping-box, and with the rotary disk provided with radial ribs, as specified.

E. N. CUMMINGS.

Witnesses:
ARCH. CUMMINGS,
IRA A. RAMSAY.